United States Patent [19]

Knapp et al.

[11] Patent Number: 4,796,721
[45] Date of Patent: Jan. 10, 1989

[54] SYSTEM FOR DISPLACING A POWER PACK FROM A VEHICLE

[75] Inventors: Malcolm H. Knapp, Lynnfield; Gerhard Sonder, Manchester, both of Mass.

[73] Assignee: General Electric Company, Lynn, Mass.

[21] Appl. No.: 70,751

[22] Filed: Jul. 6, 1987

[51] Int. Cl.⁴ .................... B60K 1/00; B60K 5/10
[52] U.S. Cl. ...................... 180/294; 180/298; 180/312; 180/9.1; 89/36.08; 254/45; 254/93 R; 248/638
[58] Field of Search .............. 180/294, 298, 312, 9.1; 248/188.5, 316.5, 404, 635, 638, 659, 669; 280/DIG. 1, 6 H, 6 R; 89/36.08; 254/45, 93 R; 212/250, 254

[56] References Cited

U.S. PATENT DOCUMENTS

| | | | |
|---|---|---|---|
| 1,078,308 | 11/1913 | Pfleider | 180/298 |
| 1,215,603 | 2/1917 | Windsor | 180/312 |
| 1,349,418 | 8/1920 | Flynn | 180/291 |
| 1,697,565 | 1/1929 | Horlacher | 248/637 |
| 1,893,609 | 1/1933 | Austin | 222/219 |
| 2,904,287 | 9/1959 | Ertsgaard et al. | 248/25 |
| 3,405,778 | 10/1968 | Martin | 180/24 |
| 3,501,039 | 3/1970 | Mitsuyasu | 414/458 |
| 3,567,271 | 3/1971 | Gostomski | 254/45 |
| 3,675,966 | 7/1972 | Luft | 254/93 R X |
| 3,783,964 | 1/1974 | Telesio | 180/64 |
| 3,952,998 | 4/1976 | Fletcher et al. | 254/93 R X |
| 4,027,737 | 6/1977 | Garry | 180/11 |
| 4,030,705 | 6/1977 | Bontrager | 254/139.1 |
| 4,325,451 | 4/1982 | Umeda | 180/294 |
| 4,679,489 | 7/1987 | Jasinski et al. | 280/6 R X |

FOREIGN PATENT DOCUMENTS 528845  11/1921  France .................. 180/312

Primary Examiner—David M. Mitchell
Assistant Examiner—Brian L. Johnson
Attorney, Agent, or Firm—Francis L. Conte; Derek P. Lawrence

[57] ABSTRACT

A system used in a vehicle having a ground-engaging attitude to effect the displacement from a compartment in the vehicle of a power pack adapted for driving the vehicle. The system elevates the power pack from a vehicle driving position within the compartment toward another position disposed exteriorly of the compartment and maintains the power pack at the same attitude as the ground-engaging attitude of the vehicle upon the elevation of the power pack. The system senses attitude variations of the power pack upon its displacement, and is actuated in response to the attitude variation for controlling operation of the displacement and maintaining functions.

38 Claims, 6 Drawing Sheets

SYSTEM FOR DISPLACING A POWER PACK FROM A VEHICLE

BACKGROUND OF THE INVENTION

This invention relates in general to a ground engaging vehicle and, in particular, to a system for effecting displacement from a compartment in the vehicle of a power pack adapted for propelling the vehicle.

A power pack for a ground-engaging vehicle, such as, for instance, a military tracked vehicle or the like, comprises an engine and a transmission coupled in driving association with tracks. The power pack is typically housed or supported in a vehicle driving position in a compartment provided therefor in a hull or body of the vehicle. In some embodiments the power pack is disposed in the vehicle compartment with at least some of the component parts of the power pack and other associated component parts mounted to the hull within the vehicle compartment not being readily accessible for servicing.

In order to effect servicing of the power pack and the aforementioned inaccessible component parts, a large wrecker, tracked recovery vehicle or a facility crane or the like was utilized to engage and lift the power pack from the vehicle compartment. Upon removal of the power pack from the vehicle compartment and subsequent to the servicing thereof, the power pack was ground hopped, i.e. test run, to ensure that it was operating satisfactorily prior to the reinstallation of the power pack in the vehicle.

Prior to the displacement of the power pack for servicing, it was necessary to disconnect various on-board fuel, oil and coolant lines and also power and control circuitry communicating between the component parts of the power pack and associated component parts mounted to the vehicle hull. When the power pack was displaced from the vehicle, it was then necessary to install jumper connections to temporarily communicate the aforementioned lines and circuitry between the power pack component parts and the associated hull-mounted component parts before the displaced power pack could be test run.

After the test run of the displaced power pack, the jumper connections were removed, and the aforementioned wrecker, tracked recovery vehicle or utility crane was utilized to reinstall the power pack in the vehicle driving position thereof in the vehicle compartment. When the power pack was reinstalled in the vehicle, it was necessary to reconnect the various on-board lines and circuitry between the power pack component parts and the associated hull-mounted component parts.

SUMMRAY OF THE INVENTION

Accordingly, it is an object of the present invention to provide a new and improved system which is self-contained in a ground-engaging vehicle and operable to effect the displacement of a power pack from a vehicle driving position within a compartment in the vehicle toward a position displaced from the compartment.

Another object of the present invention is to provide such a new and improved system which automatically compensates for attitude variations of the power pack relative to a ground-engaging attitude of the vehicle during the displacement of the power pack toward its displaced position for maintaining power pack-to-hull clearance even on unlevel ground.

Another object of the present invention is to provide such a new and improved system which has on-board extendable means for maintaining communication between certain component parts of the power pack and associated components parts mounted to the vehicle compartment when the power pack is in its displaced position.

Another object of the present invention is to provide such a new and improved system having improved quick-release means for resiliently mounting and for supporting the power pack in its vehicle driving position in the vehicle compartment.

In general and in one form of the invention, a system for use in a vehicle having a ground-engaging attitude is provided to effect the displacement from a compartment in the vehicle of a power pack adapted for propelling the vehicle. In an exemplary preferred embodiment of the invention, means are operable generally for elevating the power pack from a vehicle driving position thereof within the compartment toward a displaced position disposed, at least in part, exteriorly of the compartment and for maintaining the power pack at least generally at the same attitude as the ground-engaging attitude of the vehicle at least, during the elevation of the power pack. Means are associated with the power pack for sensing attitude variations of the power pack upon its elevation between the vehicle driving position and the displaced position, and means associated with the sensing means and the elevating and maintaining means are actuated in response to the sensed attitude variations for controlling the operation of the elevating and maintaining means

BRIEF DESCRIPTION OF THE DRAWINGS

The novel features believed characteristic of the invention are set forth in the appended claims. The invention, in accordance with preferred embodiments, together with further objects and advantages thereof, is more particularly described in the following detailed description taken in conjunction with the accompanying drawings in which:

DETAILED DESCRIPTION OF THE PREFERRED EMBODIMENT

Figure 1:
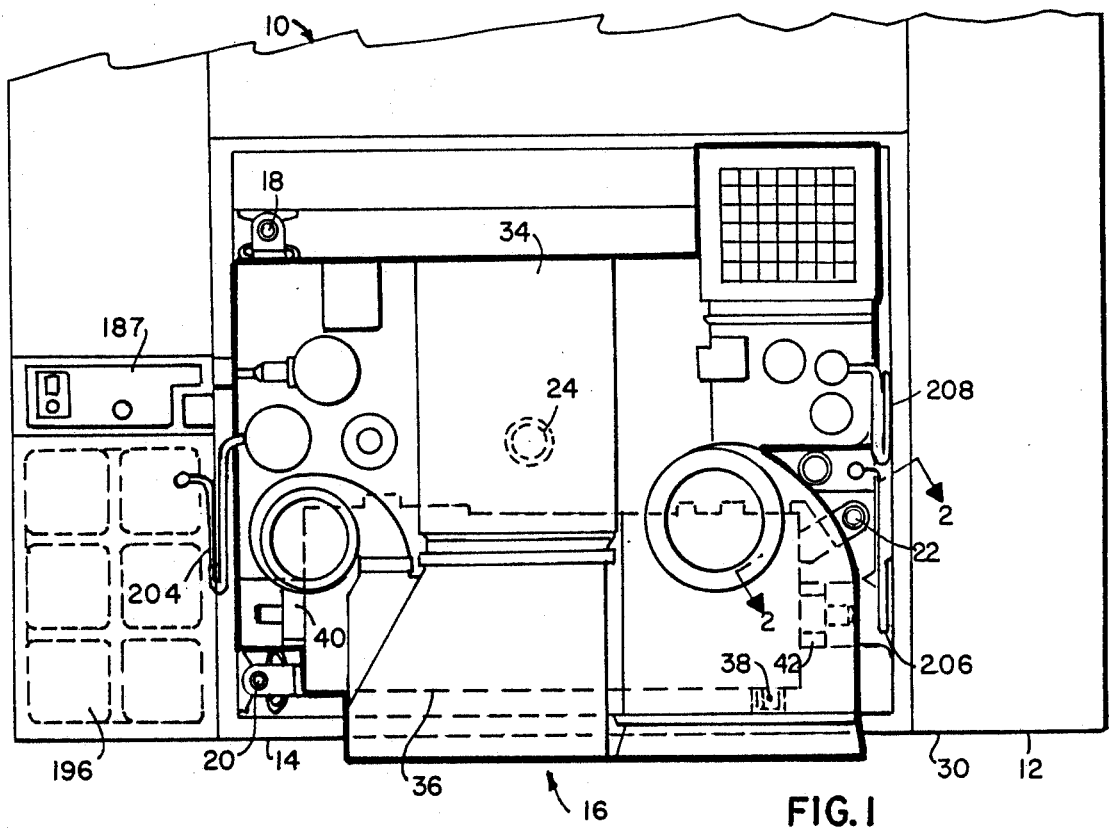
FIG. 1 is a partial top elevational view of a ground-engaging vehicle illustrating one embodiment of a system to effect the displacement from a compartment in the vehicle of a power pack adapted for driving the vehicle according to the present invention.

With reference now to the drawings in general, there is illustrated a system 10 in accordance with an exemplary preferred embodiment of the invention for use in a vehicle 12, such as, for instance, a military tracked vehicle or the like, which has a ground-engaging attitude. The system 10 is operable to effect the displacement from a compartment 14 in the vehicle 12 of a component thereof, such as, for instance, a power pack 16 adapted for propelling the vehicle (FIGS. 1–10). The system 10 has actuating or displacing means, such as, for instance, a plurality of telescopic fluid pressure responsive cylinders 18, 20, 22 or the like of a type well known in the art, operable generally for elevating or displacing power pack 16 from a vehicle driving position of first position thereof within compartment 14 toward a displaced or second position disposed, at least in part, exteriorly of the compartment 14 and for maintaining the power pack 16 at least generally at the same attitude as the ground-engaging attitude of vehicle 12 at least during the elevation of the power pack 16 (FIGS. 1–4).

Figure 10:
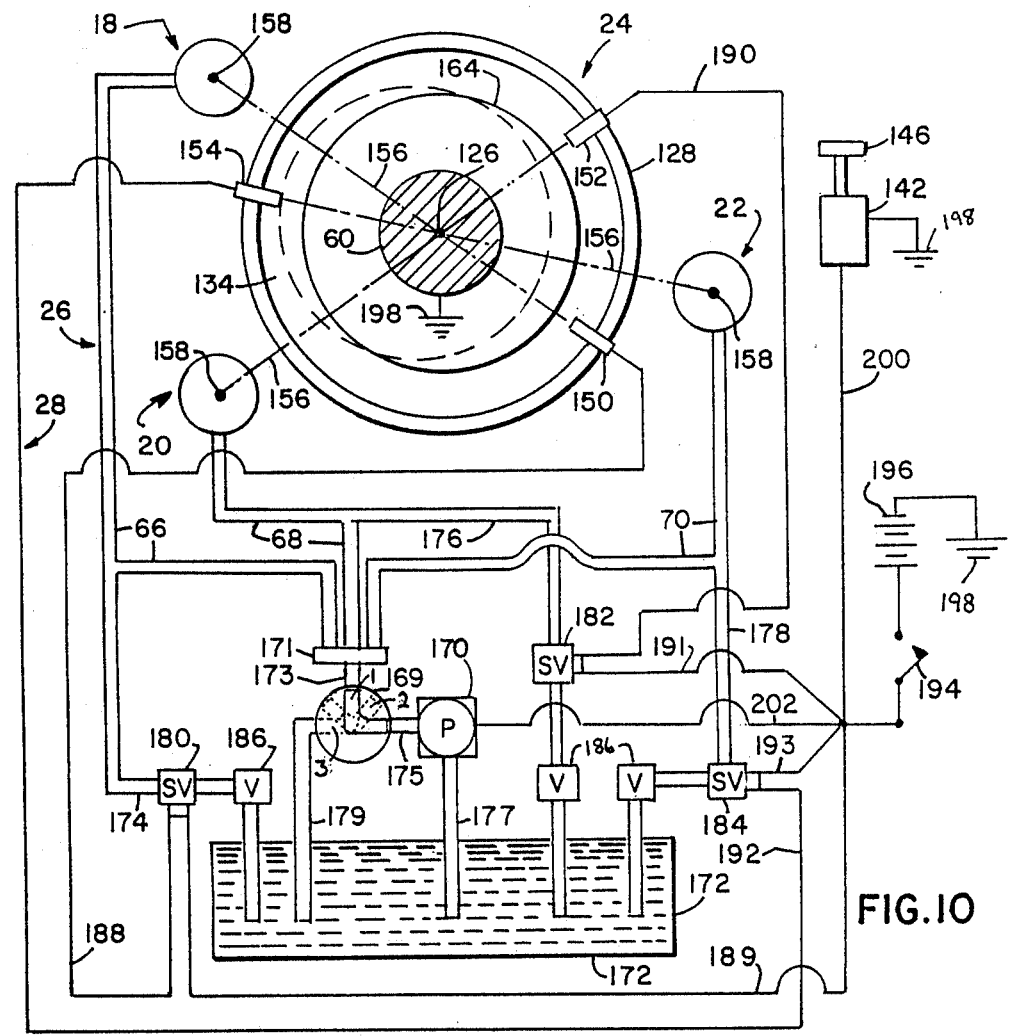
FIG. 10 is a partial diagrammatic and schematic view illustrating pressure fluid circuitry and electrical circuitry utilized in the system of the present invention and also showing a sectional view of the sensing device taken along line 10—10 in FIG. 9 to illustrate the connection of the sensing device in the electrical circuitry.
Figure 9:
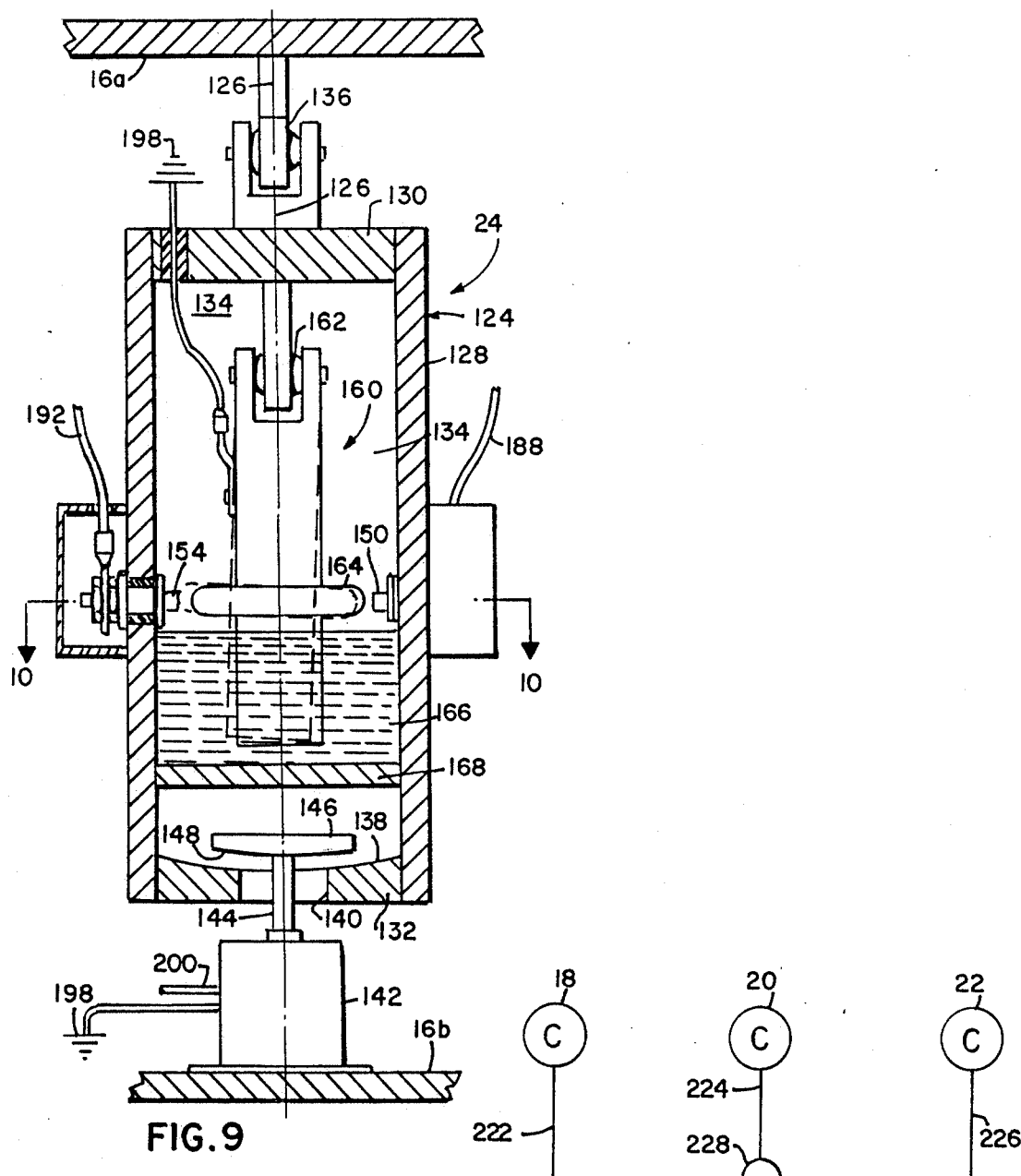
FIG. 9 is a sectional view showing a sensing device utilized in the system of the present invention.

Means, such as, for instance, a sensor or level sensing device 24 or the like, are associated with power pack 16 for sensing attitude variations of the power pack 16, at least during its elevation between the vehicle driving position and the displaced position. Means, such as, for instance, pressure fluid circuitry 26 and electrical circuitry 28 or the like, associated with the sensing means 24 and the elevating and maintaining means, or cylinders 18, 20, 22, are actuated in response to the sensed attitude variations for controlling the operation of the cylinders (FIGS. 9 and 10). As used herein, the terminology, ground-engaging attitude, means the angle of tilt or inclination, if any, of vehicle 12 with respect to the horizontal.

More particularly, in accordance with one embodiment of the present invention and with specific reference to FIGS. 1 and 4-6, compartment 14 is defined in vehicle 12 by a body or hull 30 thereof which may be formed of any suitable material, such as, for instance, steel. When power pack 16 is disposed or located in its vehicle driving position, the compartment 14 may be enclosed by suitable means, such as, for instance, a suitably pivoted deck or hood 32 (shown in an open position in FIG. 4), associated with the vehicle hull 30 so as to form a part thereof. As well known in the art, the power pack 16 generally comprises a unit having an engine or engine section 34 and a transmission or transmission section 36 suitably affixed together. The engine 34 may be drivingly associated with the transmission 36 to effect the propulsion or drive of vehicle 12 when the power pack 16 is in its vehicle driving position.

Means for releasably mounting the power pack 16 in the vehicle 12 comprise at least one releasably secured means, such as, for instance, a quick-release resilient mount 38 or the like, which is provided for resiliently mounting the power pack 16 to the hull 30 within compartment 14. Also provided is a pair of means, such as, for instance, quick-release supports 40, 42 or the like, which are mounted to the hull 30 within the compartment 14 and releasably receive a pair of generally opposite annular trunnions or extension means 44, 46 on transmission 36 of the power pack 16 for supporting or mounting it, as discussed in greater detail hereinafter.

A pair of generally opposed drive shafts 48, 50 adapted to be rotatably driven by the transmission 36 extend through trunnions 44, 46 thereof. Although not shown or otherwise described herein for purposes of drawing simplification and brevity of disclosure, the drive shafts 48, 50 are conventionally drivingly coupled with suitable means for effecting the actuation of a plurality of ground-engaging members, such as, for instance, a pair of endless tracks 52, 54 or the like on the vehicle 12 thereby to propel or drive the vehicle 12 in the ground-engaging attitude thereof, as well known in the art.

Figure 2:
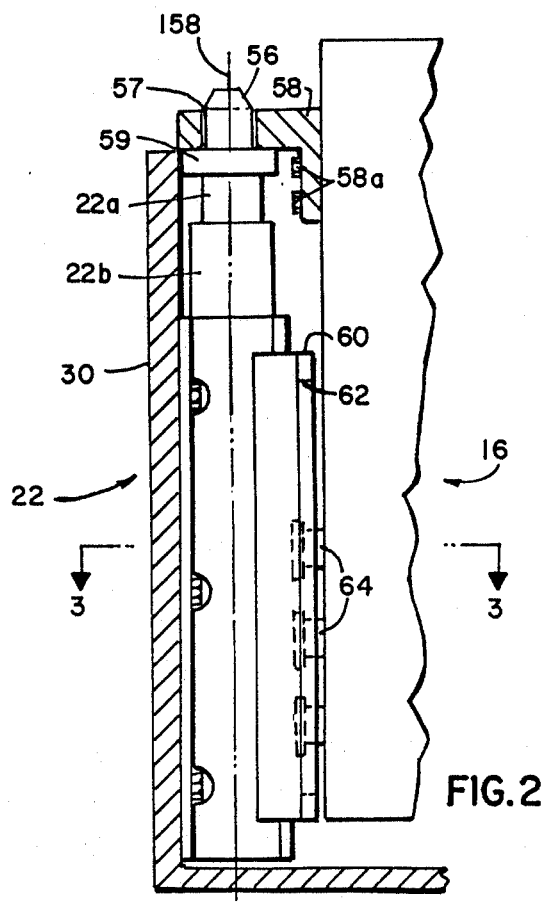
FIG. 2 is a partly sectional view taken along line 2—2 in FIG. 1 illustrating an exemplary actuating cylinder.

The telescopic cylinders 18, 20, 22 are mounted by suitable means, such as bolting, for instance, to the hull 30 within the compartment 14. In the preferred embodiment of the invention the cylinders are substantially identical for reducing any difference in rate of actuation thereof. Accordingly, the following description of cylinder 22, as illustrated in more detail in FIGS. 2 and 3, is equally applicable to cylinders 18, 20.

An upper cylindrical end 56 of each cylinder 18, 20, 22 is removably received in a respective opening 57 provided in a plurality of plates 58 secured by suitable means, such as bolts 58a, for instance, to suitable portions of power pack 16. A flange 59 adjacent to the upper end 56 of the cylinder 22 is disposed in abutment with the plate 58 thereby to interconnect the cylinder 22 with the power pack 16.

A guide rail or guiding means 60, which is grooved at 61 and has an elongate slot 62 therein, is mounted in sliding and guiding relation to cylinder 22 for reciprocal movement relative thereto for isolating side loads from the cylinder 22. A plurality of keepers or slides 64 are mounted by suitable means, such as bolting, for instance, to power pack 16 and are received in reciprocal sliding relation in the guide rail slot 62 for lost motion engagement or abutment with the guide rail 60. The cylinder 22 includes spaced elongated tongues or extensions 65 slidably secured in the grooves 61 of guide rail 60, respectively.

Figure 3:
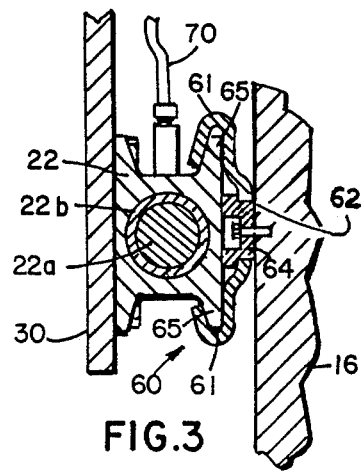
FIG. 3 is a sectional view taken along line 3—3 in FIG. 2.

The cylinders 18, 20, 22 are interconnected in pressure fluid circuitry 26 of system 10, as illustrated in FIGS. 3 and 10, by a plurality of conduits or conduit means 66, 68, 70, as discussed in greater detail hereinafter. Therefore, upon the release of resilient mount 38 and supports 40, 42 and disengagement of output shafts 48, 50, cylinders 18, 20, 22 are relatively movable in response to fluid pressure supplied thereto via conduits 66, 68, 70 to effect the elevation of power pack 16 from its vehicle driving position in compartment 14 toward the displaced position of the power pack 16 and previously mentioned.

Upon the elevation of power pack 16, slides 64 carried by the power pack 16 are initially movable upwardly in the slots 62 of guide rails 60 with lost motion relative thereto; and upon the abutment of the slides 64 with the guide rails 60 at the upper ends of the slots 62, the slides 64 and the guide rails 60 are conjointly movable upwardly with the grooves 61 of guide rails 60 being slidable over the extensions 65 in guided relation thereof on cylinders 18, 20, 22, respectively. Although three cylinders 18, 20, 22 are illustrated herein in a preferred embodiment for effecting the elevation of power pack 16, as discussed in more detail below, it is believed that any desired number of cylinders, i.e. one or more, may be utilized to effect the power pack elevation within the scope of the invention so as to meet at least some of the objects thereof.

Furthermore, while cylinders or jacks 18, 20, 22 and the particular guiding arrangement of power pack 16 therewith are illustrated herein for purposes of diclosure, it is contemplated that various types of jacks, such as, for instance, ball screw jacks or the like, and different types of guiding arrangements may be utilized within the scope of the invention so as to meet at least some of the objects thereof.

Figure 5:
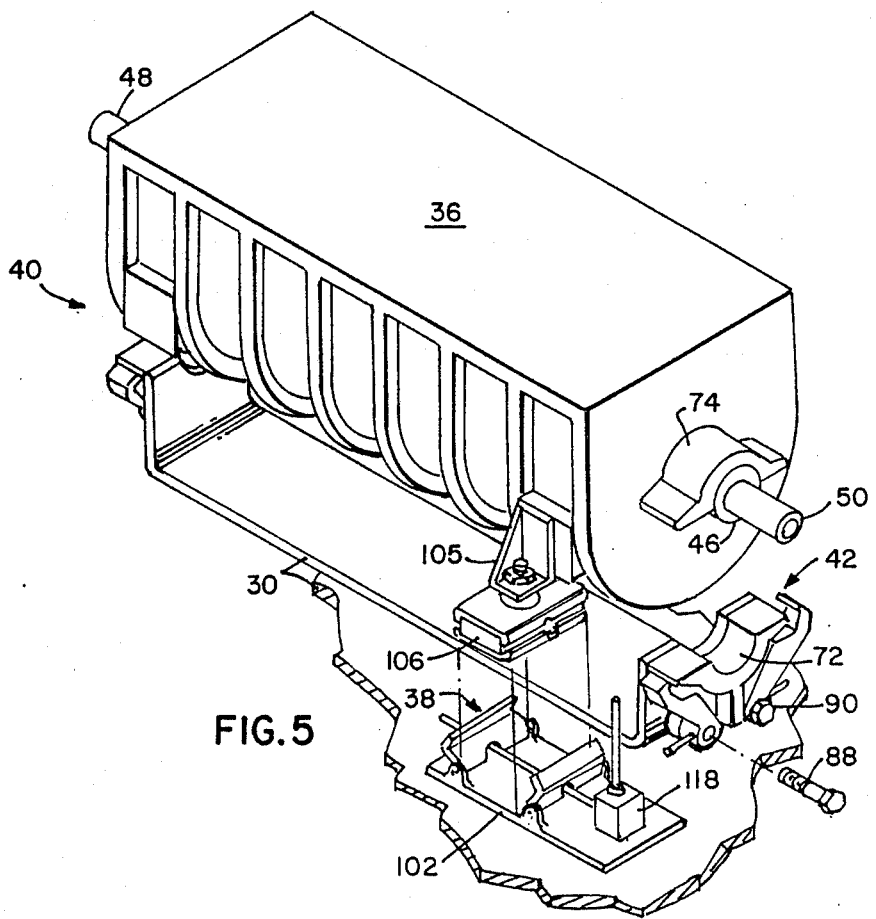
FIG. 5 is a schematic perspective view of the transmission of the power pack disassociated from the vehicle to illustrate with greater clarity quick-release mounting and supporting devices removably associated between the transmission and the vehicle for respectively resiliently mounting and for supporting the power pack in a vehicle driving position within the vehicle compartment.
Figure 6:
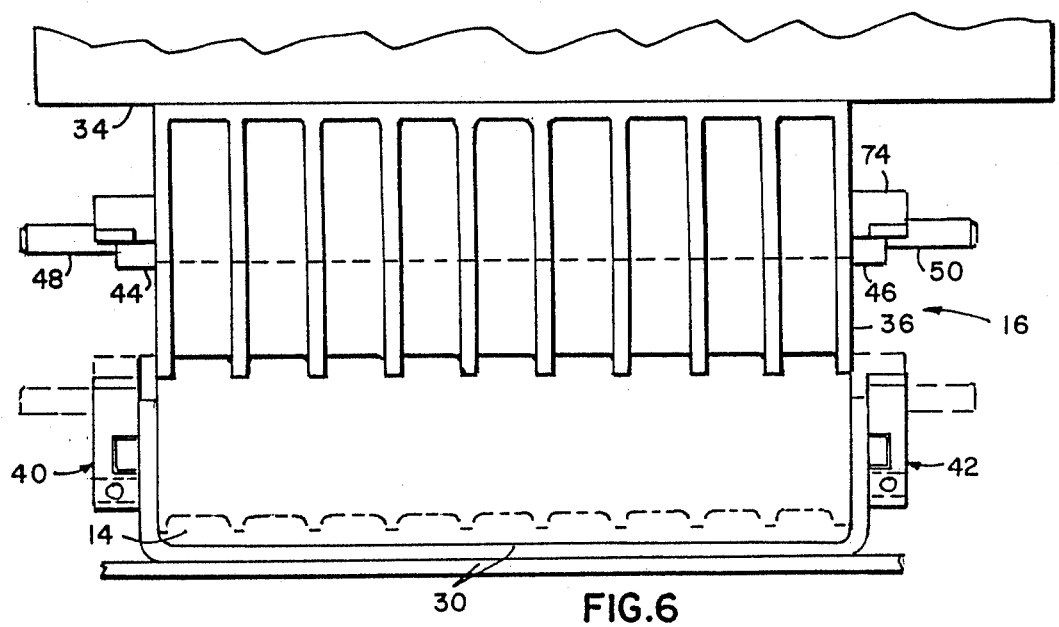
FIG. 6 is a schematic view partially in cross section of the transmission disposed in a vehicle driving position and a displaced position in the vehicle compartment with other vehicle components therein removed for clarity.
Figure 8:
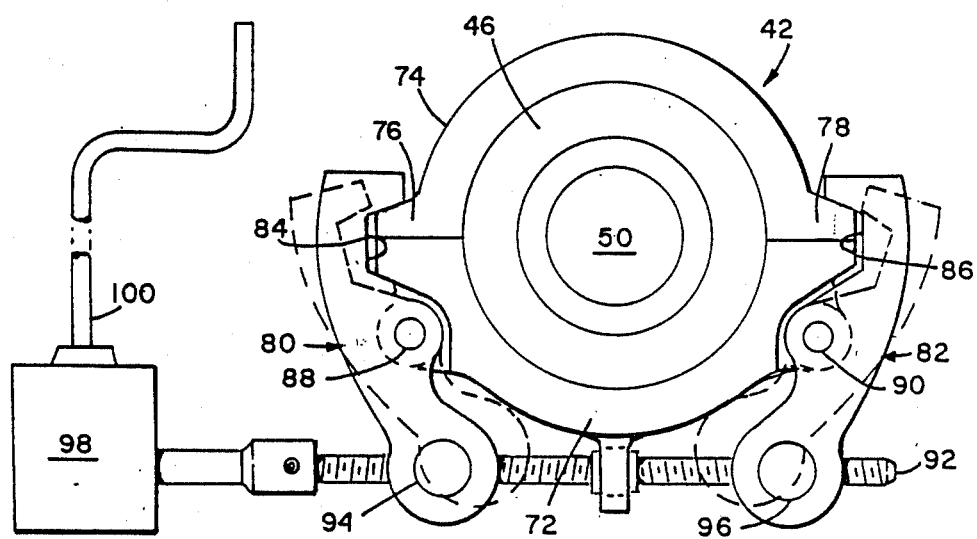
FIG. 8 is an enlarged side view of one of the supporting devices of FIG. 5 associated in supporting relation with a trunnion provided therefor on the transmission.

As best seen in FIGS. 5, 6 and 8, the quick-release supports of supporting means 40, 42 are of like constructions and disposed in like mounting arrangements with the transmission 36 of power pack 16. Therefore, for the purpose of drawing simplification and brevity of disclosure, only support 42 is shown in detail and discussed hereinafter. Support 42 includes means, such as, for instance, a generally semi-circular saddle 72, for seating in engagement with an outer circumferential part of trunnion 46 on transmission 36, and means, such as, for instance, a complementary semi-circular cap 74, are arranged generally in opposed relation with seating means or saddle 72 for extending about a generally opposite outer circumferential part of the trunnion 46. Thus, power pack 16 is located in its vehicle driving position when trunnions 44, 46 on transmission 36 of the power pack 16 are seated or received on saddle 72 of supports 40, 42, respectively.

The cap 74 is provided with a pair of generally opposite latching ears 76, 78; and a pair of jaws or jaw means 80, 82 are relatively or pivotally movable with respect to saddle 72 for releasable engagement with the opposite latching ears 76, 78 of the cap 74 thereby to releasably secure support 42 about trunnion 46. When jaws 80, 82 are releasably engaged with cap 74, the latching ears 76, 78 are received in a pair of notches 84, 86 provided in the jaws 80, 82 so that the jaws 80, 82 are disposed in overlaying or displacement-preventing engagement with the latching ears 76, 78. A pair of bolts 88, 90 extend through saddle 72 thereby mounting it to vehicle hull 30 within compartment 14. Jaws 80, 82 are pivotally mounted on the bolts 88, 90, respectively.

Means, such as, for instance, a first shaft 92 having left hand and right hand threads, is arranged in driving engagement with jaws 80, 82 through a pair of respectively complementary threaded swivel nuts 94, 96 in the jaws 80, 82 adjacent to the lower ends thereof for effecting the relative movement of the jaws. A worm gearbox or torque transmission means 98 is suitably mounted to the hull 30 within compartment 14 and is operable for rotating the first shaft 92 to effect the driving engagement thereof with jaws 80, 82 through swivel nut 94, 96 therein. Thus, shaft 92 and gearbox 98 comprise a means for selectively positioning jaws 80, 82 in a first position clamping the trunnion 46 between the cap 74 and saddle 72 and in a second position allowing said cap 74 to be removed for releasing the trunnion 46 from the saddle 72. When manually operated by a suitable tool, such as, for instance, a crank 100 or the like, gearbox 98 is actuated to effect the rotation of worm gear 92 to threadedly drive swivel nuts 94, 96 in jaws 80, 82 thereby to selectively effect pivotal movement of the jaws 80, 82 about mounting bolts 88, 90 in directions to either engage notches 84, 86 with latching ears 76, 78 on cap 74 (as shown in FIG. 8) or to release the jaw notches 84, 86 from such engagement (as shown in dashed lines in FIG. 8).

When power pack 16 is operated to drive the vehicle 12, reaction torque due to rotation of the shafts 48, 50 is imparted to the power pack 16 generally about the supporting engagement of quick-release supports 40, 42 and grounding to the hull 30 at mount 38. Such torque, as well as other shock loads which may be imparted to the power pack 16, is dampened or cushioned by the resilient mount 38, as discussed hereinafter.

Figure 7:
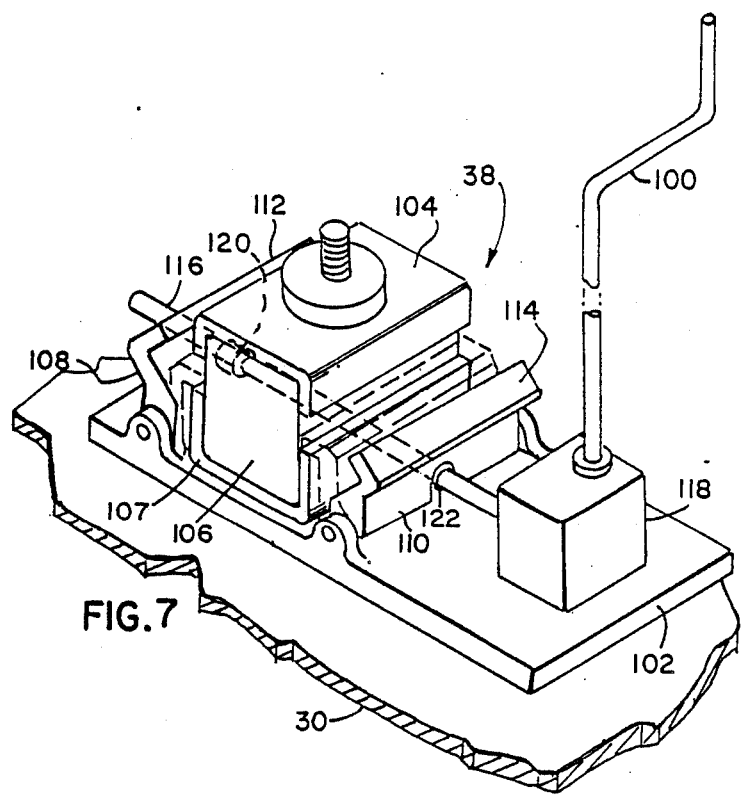
FIG. 7 is an enlarged perspective view of the resilient mounting device of FIG. 5 disassociated from the power pack and the vehicle.

As best seen in FIGS. 5 and 7, resilient mount 38 has means, such as, for instance, mounting plates 102, 104 for mounting by suitable means to power pack 16 and vehicle hull 30 within compartment 14. For example, the lower plate 102 may be welded or bolted to the hull 30, and the upper plate 104 may be suitably bolted, as shown in FIG. 5, to a flange 105 extending from the transmission 36. Resilient means, such as, for instance, a resilient cushion or block 106 of a suitable elastic material having the desired physical and resilient properties, such as, for example, rubber, is fixedly attached to and between the plate 104 and a U-shaped plate 107. The block 106 is disposed for cushioning engagement between the mounting plates 102, 104 thereby to dampen or cushion any slight rotation of the power pack 16 due to the aforementioned torque as well as other shock loads which may be imparted to the power pack 16 upon the operation thereof to drive vehicle 12. Inasmuch as supports 40, 42 are generally coaxially mounted, and therefore power pack 16 will tend to rotate about an axis, at least one resilient mount 38 is preferably mounted at a preselected distance from that axis to resist such tendency for rotation in either forward or reverse driving directions.

A pair of means, such as, for instance, elongate jaws or jaw means 108, 110, are pivotally secured by suitable means, for example bolts, to mounting plate 102 so as to be movable for releasable engagement with mounting plate 107 thereby to retain plate 104 against displacement from its position in cushioning engagement with the mounting plate 102. When jaws 108, 110 are engaged with mounting plate 107 (as shown in dashed line in FIG. 7), a pair of distal flanges or flange means 112, 114 on the jaws, respectively, extend therefrom into overlaying engagement with mounting plate 107.

Means, such as, for instance, a second shaft 116 having left and right hand threads, and a worm gearbox or torque transmitting means 118 drivingly associated therewith on mounting plate 102, are operable for effecting the pivotal movement of jaws 108, 110. Second shaft 116 is arranged in driving engagement with jaws 108, 110 through a pair of threaded swivel nuts 120, 122 suitably secured in the jaws 108, 110, respectively, to effect the pivotal movement thereof. The gearbox 118 is operable for driving or rotating the shaft 116 to effect the driving engagement thereof with jaws 108, 110 through swivel nuts 120, 122 therein. Thus, shaft 116 and gearbox 118 comprise a means for selectively positioning jaws 108, 110 in a first position to clamp the plate 107, attached to the block 106 and the plate 104, to the plate 102, and in a second position allowing the plate 107, and plate 104, to be displaced from the second plate 102 for displacing the transmission 36.

When manually operated by a suitable tool, such as, for instance, crank 100, gearbox 118 is actuated to effect the rotation of shaft 116, which threadedly drives swivel nuts 120, 122 to effect pivotal movement of jaws 108, 110 about mounting plate 102 in directions to either engage flanges 112, 114 of the jaws in the first position in overlaying or displacement preventing engagement with mounting plate 107 (as shown in dashed line in FIG. 7) or in the second position to release the jaw flanges from such engagement (the released position being shown in solid lines in FIG. 7). Thus, it may be noted that resilient mount 38 is not only effective to cushion the aforementioned torque and shock loads which may be imparted to power pack 16 but is also manually and quickly releasable from or engaged with the power pack 16 in the vehicle driving position thereof. It may be further noted that the structure and operation for engagement and release of resilient mount 38 are generally similar to that of supports 40, 42.

The sensing means 24 is provided with a generally elongate cylindrical housing or housing means 124 having a central axis 126, which housing 124 may be formed of any suitable material, as best seen in FIGS. 9 and 10. Housing 124 has a generally annular sidewall 128 interposed between a pair of generally opposite or upper and lower ends or end walls 130, 132, respectively, which define a chamber 134 within the housing 124. Upper end wall 130 is pivotally mounted by suitable means 136, such as a conventional spherical ball joint, for instance, on central axis 126 of housing 124 to an upper part 16a of power pack 16. The housing 124 is pivotally movable about its upper end wall 130 only, i.e. a pendulum, so as to be disposed in a vertical suspended position from the power pack 16 whether the ground-engaging attitude of vehicle 12 is tilted or horizontal. As previously mentioned, the attitude of power pack 16 in its vehicle driving position is at least generally comparable to or indicative of the ground-engaging attitude of vehicle 12. A partial spherical or concave inner surface 138 on lower end wall 132 of housing 124 is generally radially aligned about central axis 126 through pivot 136 in facing relating with chamber 134. A generally central or axial opening 140 is disposed in lower end wall 132 about the central axis 126.

A conventional electrical solenoid 142 is mounted to a lower part 16b of power pack 16 generally in coaxial relation with central axis 126 in the vertical suspended position thereof, and an armature actuated stem 144 of the solenoid 142 extends therefrom generally coaxially through housing opening 140 in spaced relation therewith to accommodate pendulum movement of the housing 124. An enlarged head 146 on stem 144 has a partial spherical or convex surface 148 thereon spaced from and complementary to the concave surface 138 of housing 124 and arranged for gripping engagement thereagainst upon the energization of solenoid 142, which is connected in the electrical circuit 28 of system 10.

When solenoid 142 is energized, as discussed in greater detail hereinafter, stem 144 is actuated to move head 146 toward a position gripping surface 148 thereon in engagement with concave surface 138 of lower end wall 132, which is otherwise unrestrained. Therefore, in response to the aforementioned gripping engagement, it may be noted that housing 124 is retained or maintained in that vertical suspended position at the time of solenoid 142 actuation against further pendulum movement with respect to power pack 16 to provide a reference indication of the attitude of the transmission 36, and thereby also of the power pack 16. It may be further noted that the aforementioned gripping engagement coaction of housing 124 and solenoid 142 is sustained thereby to capture the housing 124 in the vertical suspended position thereof at least during the initial elevation of power pack 16 from the vehicle driving position toward the displaced position thereof by cylinders 18, 20, 22, as discussed in greater detail hereinafter.

A plurality of electrical contacts or contact means 150, 152, 154 connected in electrical circuit 28 of system 10 are mounted to sidewall 128 of housing 124 within chamber 134 thereof. The contacts 150, 151, 154 are arranged in preselected locations or positions generally at the same level in the housing 124 and generally circumferentially spaced apart about the housing sidewall 128. In one embodiment, the sensing device 24 is preferably located between the cylinders 18, 20, 22 so that the contacts 150, 152, 154 are aligned on a plurality of radial lines 156 extending through central axis 126 of housing 124 in the vertical suspended position thereof and a plurality of central axes 158 of cylinders 18, 20, 22 in the mounted vertical positions thereof in vehicle compartment 14, as best seen in FIG. 10. Furthermore, the contacts 150, 152, 154 are preferably disposed in the sidewall 128 so that a pendulum switch 160 as described below is disposed between the contacts 150, 152, 154 and the respective cylinders 18, 20, 22.

Alternatively, the sensing device 24, with the contacts 150, 152 and 154 positioned as described above, may be located at any position in the power pack 16 as long as the angular positions of the contacts 150, 152 and 154 about a circle are maintained relative to the angular positions of the cylinders 18, 20 and 22. In other words, the contacts 150, 152 and 154 should be mounted about a circle so that larger extension of each of cylinders 18, 20 and 22, respectively, relative to the other two tends to cause pendulum switch 160 to pivot toward contacts 150, 152 and 154, respectively.

A generally elongate pendulum member, such as a switch or switching means 160 for instance, has its upper end pivotally mounted by suitable means 162, such as a spherical ball joint for instance, to upper end wall 130 within chamber 134 coaxially along the central axis 126. Therefore, it may be noted that switch 160 is suspended within chamber 134 so as to be pivotally movable in pendulum fashion relative to housing 124 for switching between a plurality of switching modes or electrical contacts. Switch 160 is also suitably connected in the electrical circuit 28 of system 10, as later discussed, and the switch 160 may be formed of any suitable electrically conductive material. A circumferential switch contact or contact flange 164 is integrally provided on an intermediate portion of switch 160 extending generally radially therefrom for making engagement or contact with at least one of housing contacts 150, 152, 154 in one of the switching modes of the switch 160 and for breaking or being disengaged from such contact in another of the switching modes of the switch 160.

In operation, housing 124 is in its vertically suspended position with respect to the earth, and switch 160 is also in a vertically suspended position generally in alignment with housing central axis 126 so that switch contact flange 164 is disengaged from housing contacts 150, 152, 154. However, and as discussed in greater detail hereinafter, it may be further noted that switch 160 remains in its vertical suspended position within chamber 134 of housing 124 in the event of any variaton or inclination of the housing 124 from its captured vertical suspended position when solenoid 142 is energized; and upon the occurrence of such variation, at least one of contacts 150, 152, 154 on the housing 124 will be moved with the housing 124 relative to and into making engagement with the switch 160 in its vertical suspended position within the housing chamber 134.

If desired, means, such as, for instance, a viscous damping fluid 166, may be optionally utilized in housing chamber 134 for damping the pendulum movement therein of switch 160. However, in such an embodiment housing 124 would be provided with an intermediate wall 168 to contain the damping fluid 166 within the housing chamber 134.

While sensing means 24 is illustrated and described herein with respect to system 10 for purposes of disclosure, it is contemplated that various other different means for sensing attitude, such as for sensing vertical or horizontal attitudes, may be utilized within the scope of the invention so as to meet at least some of the objects thereof. The sensing means 24 provides an indication of the relative attitude of the power pack 16 for use in maintaining the attitude of the power pack 16 as it is displaced. In an exemplary embodiment of the invention, the power pack 16 is provided with a relatively small clearance of about 1.0 inch between it and the hull 30. Accordingly, in order to displace the power pack 16 without interference due to any tilting thereof, the sensing means provide an indication for use in maintaining a fixed attitude of the power pack 16 as it is displaced, and thus power pack-to-hull clearance is kept essentially constant.

Figure 11:
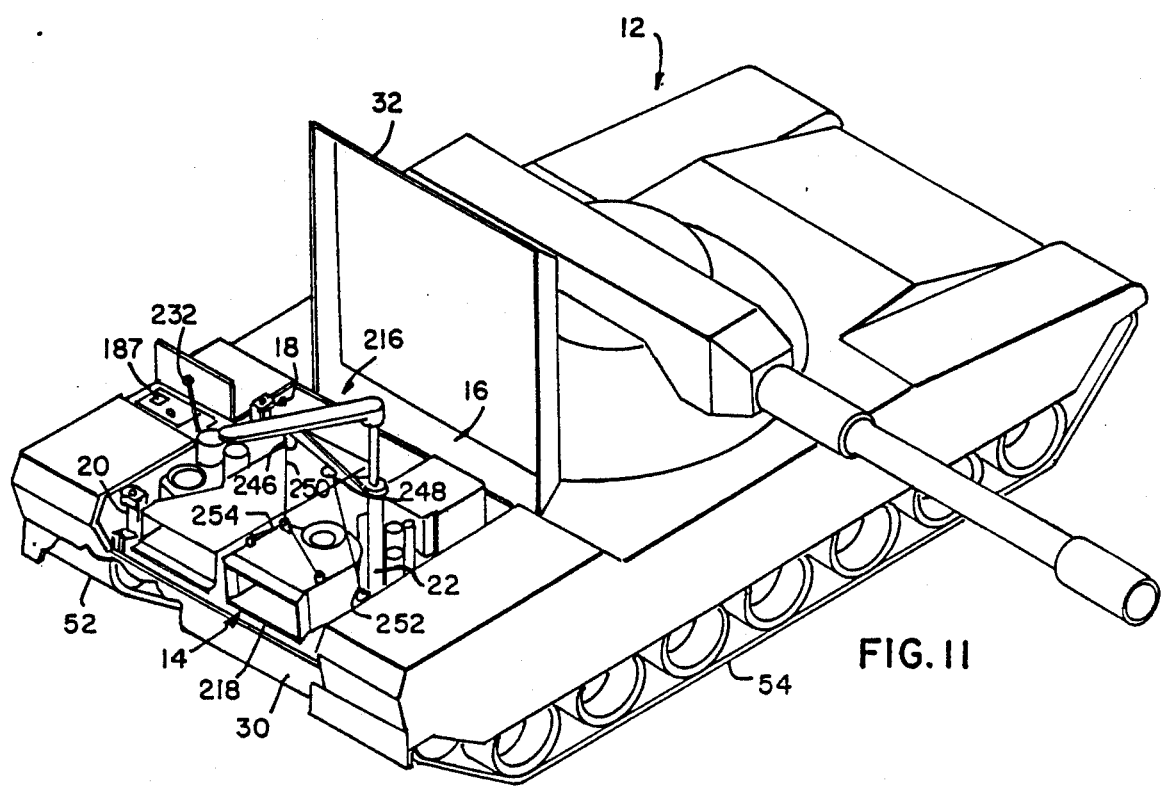
FIG. 11 is a partial perspective view of the vehicle of FIG. 1 illustrating the manual operation of a portion of the system of the present invention to effect the displacement of a component part of the power pack therefrom when the power pack is in its vehicle driving position.
Figure 13:
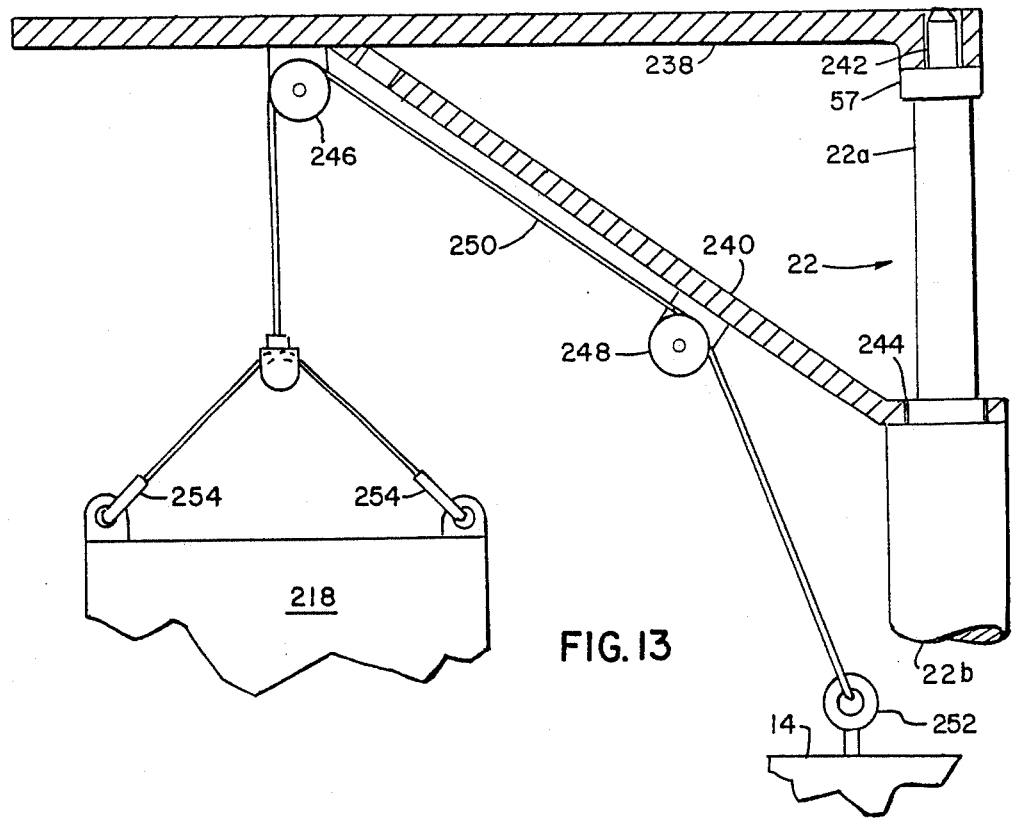
FIG. 13 is a partial side elevational view showing a derrick device of FIG. 11 partially in cross section.

In pressure fluid circuit 26 of system 10, as illustrated in FIG. 10, conduits 66, 68, 70 are connected in pressure fluid communication to a fluid manifold 171. The manifold 171 is connected in fluid communication by a conduit 173 to a conventional manually or electrically operable three-way valve 169. A fluid pressure source, such as, for instance, an electrical motor-driven pump or pumping means 170 and a prssure fluid reservoir 172 therefor are provided. The pump is fluidly connected to the valve 169 by conduit 175 and to the reservoir 172 by conduit 177. A plurality of bypass conduits or conduit means 174, 176, 178 are connected in bypass pressure fluid communication, respectively, between conduits 66, 68, 70 and the pressure fluid reservoir 172 for bypassing pressure fluid flow away from the cylinders 18, 20, 22. A plurality of means, such as, for instance, conventional electric solenoid valves 180, 182, 184, are connected in electrical circuit relation with sensing means 24, as discussed hereinafter, and in pressure fluid communication with reservoir 172 for regulating, by bleeding from conduits 66, 68, 70, the magnitude of fluid pressure supplied from the pump 170 to cylinders 18, 20, 22 in response to the attitude variations of power pack 16 sensed by sensing means 24. Solenoid valves 180, 182, 184 are suitably interposed in bypass conduits 174, 176, 178; and when deenergized, the solenoid valves 180, 182, 184 interrupt or prevent pressure fluid communication through the bypass conduits 174, 176, 178. If desired, a plurality of of manually adjustable means, such as, for instance, conventional needle valves 186 or the like, may also be interposed in bypass conduits 174, 176, 178 for adjusting the total flow rate of pressure fluid therethrough, respectively. For more convenient access, pressure fluid circuit 26 and electric circuit 28 may be located at least in part within another compartment 187 at least generally adjacent to compartment 14 of vehicle 12, in which power pack 16 is housed, as best seen in FIGS. 1 and 11.

As illustrated in FIGS. 9 and 10, electric circuit 28 of system 10 comprises a plurality of electrical leads 188, 190, 192 which are respectively connected to solenoid valves 180, 182, 184 and contacts 150, 152, 154, respectively, of sensing means 24. Electrical leads 189, 191, 193 respectively connect the solenoid valves 180, 182, 184 to a manually operable enabling switch or switch means 194 for effecting the enablement of system 10. Enabling switch 194 is connected in circuit relation with a suitable system power source, such as, for instance, a battery 196 of vehicle 12. Grounding electrical leads of pump 170, solenoid 142 and pendulum switch 160 are respectively connected to an electrical ground 198, and power leads 200 and 202 connect the solenoid 142 and pump 170, respectively, in circuit with enabling switch 194.

Figure 4:
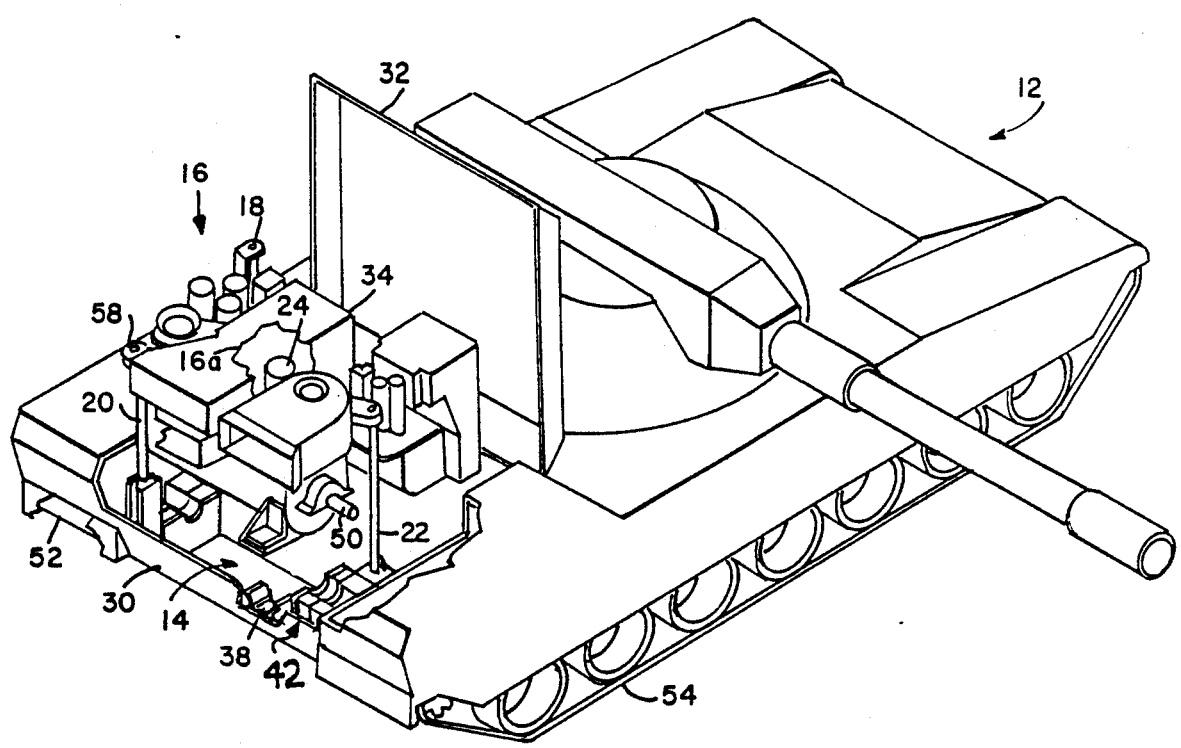
FIG. 4 is a partial perspective view of the vehicle of FIG. 1 showing the power pack displaced from the vehicle compartment.

When servicing of power pack 16 in vehicle 12 is desired, hood 32 of vehicle compartment 14 is opened, and an operator effects the manual release of resilient mount 38 and support mounts 40, 42 from the power pack 16 in the vehicle driving position thereof, as previously described and shown in FIGS. 4 and 5. Further, the operator also suitably disconnects or effects the displacement of drive shafts 48, 50 from the driven engagement thereof with tracks 52, 54. Thereafter, the operator closes enabling switch 194, which is shown in an open position in FIG. 10, and places the valve 169 in a first, open position 1 (shown in solid lines), fluidly connecting the pump 170 to the manifold 171 for supplying pressurized fluid to the cylinders 18, 20, 22. Upon the closure of the enabling switch 194, solenoid 142 of sensing means 24 and pump 170 are energized through leads 200 and 202, and housing contacts 150, 152, 154 are connected through leads 188, 190, 192 in circuit relation with battery 196 without effecting the energization of solenoid valves 180, 182, 184. As previously mentioned and shown in FIG. 9, the energization of solenoid 142 effects the gripping engagement coaction of head 146 thereof with the lower end wall 132 of housing 124 to capture the housing 124 in its vertically suspended position at time of energization in power pack 16. The energization of pump 170 effects the delivery of pressurized fluid from reservoir 172 through the valve 169 in its open position 1 and through the manifold 171 and conduits 66, 68, 70 to effect the supply of pressure fluid to cylinders 18, 20, 22. The cylinders are actuated in response to the supplied pressure fluid to effect the elevation of power pack 16 from the vehicle driving position toward the displaced position thereof, as previously discussed.

Since the attitude of power pack 16 in its vehicle driving position is the same as the ground-engaging attitude of vehicle 12, it may be noted that sensing means 24, attached to the power pack 16, is therefore operable to sense the ground-engaging attitude of the vehicle 12 whether it is parked so that its ground-engaging attitude is level or horizontal or whether its ground-engaging attitude is tilted or inclined from the horizontal. In either case, the above-discussed gripping engagement coaction between housing 124 and solenoid 142 of sensing means 24 maintains the housing in its captured vertical suspended position upon the enablement of system 10. For example, when the vehicle 12 is level, the housing 124 will be captured so that it is substantially perpendicular ot the portion 16a as illustrated in FIG. 9. When the vehicle is tilted, the housing 124 will be captured in a position correspondingly tilted with respect to the portion 16a.

Of course, housing 124 will always be initially captured in a vertical suspended position, because it act as as a pendulum when unrestrained. Switch 160 is always in a vertically suspended position because, except for damping fluid, if used, it acts as an unrestrained pendulum. At the moment of capture of housing 124, switch 160 and housing 124 are generally coaxial so that contact flange 164 of the switch 160 is disengaged from housing contacts 150, 152, 154.

Therefore, the enablement of system 10 effects the actuation of cylinders 18, 20, 22 in response to the supplied fluid pressure to elevate power pack 16 from the vehicle driving position toward the displaced position thereof when the ground-engaging attitude of vehicle 12 is horizontal or tilted.

It may be further noted that the sensing means 24 is operable to sense variations in the attitude of power pack 16 from the sensed ground-engaging attitude of vehicle 12 which may occur during the elevation of the power pack 16 from the vehicle driving position toward the displaced position thereof. In such event, the gripping engagement coaction between housing 124 and head 146 of solenoid 142 of sensing means 24 which maintains the housing 124 in its captured position is also effective to cause the conjoint movement of the housing 124 with the power pack 16 through its attitude variation. The attitude of power pack 16 may vary as it is elevated due to any differences in operation of the cylinders 18, 20, 22, which would cause relatively different actuated lengths thereof. For example, power pack 16 may tilt away from cylinder 22 if cylinder 22 extends more than cylinders 18 and 20. Since housing contacts 150, 152, 154 are predeterminedly aligned opposite to cylinders 18, 20, 22, as previously mentioned, the conjoint movement of housing 124 with the power pack 16 through its attitude variation, or tilt, is effective to move housing contact 154 into engagement with contact flange 164 on switch 160 in its vertical suspended position within chamber 134 of the housing 124, as shown in dotted outline in FIGS. 9 and 10.

Of course, the degree of attitude variation, or tilt, at which the switch 160 is connected to the contacts 150, 152, 154 may be preselected based on the spacing of the contacts 150, 152, 154 from the contact flange 164, and the relative dimensions of the sensing device 24 and its position relative to the cylinders 18, 20, 22. For example only, for preventing any interference of the power pack 16 with the hull 30 during elevation, when a clearance therebetween of about 1.0 inch is provided, the sensing device is designed to be actuated at about plus or minus 2 degrees of tilt of the housing 124 with respect to the switch 160.

The engagement between switch contact flange 164 and housing contact 154 completes the circuit from ground 198 through switch 160, lead 192, solenoid valve 184 and switch 194 to battery 196 thereby to effect the energization of solenoid valve 184. Upon the energization of solenoid valve 184, it opens bypass conduit 178 to bleed pressure fluid therethrough from cylinder 22 and conduit 70 to reservoir 172. When pressure fluid is so bled from cylinder 22, the magnitude and volume flow rate of the pressure fluid supplied through conduit 70 to the cylinder 22 from pump 170 are, of course, reduced below those of the pressure fluid supplied from the pump 170 through conduits 66, 68 to cylinders 18, 20. In this manner, the actuation of cylinder 22 is correspondingly reduced thereby to permit cylinders 18, 20 to catch up and eliminate or correct the attitude variation of power pack 16 caused by the relatively greater extension of cylinder 22. Needle valve 186 in conduit 178 may be adjusted to select the pressure drop therethrough for controlling the rate at which cylinders 18, 20 catch up to cylinder 22.

Upon the correction of the attitude variation in power pack 16, its attitude coincidental with the ground-engaging attitude of vehicle 12 is substantially restored, and housing 124 of sensing means 24 is conjointly movable with the power pack 16 to restore the attitude of pendulum switch 160 to substantially a central position in the housing 124 to thereby break housing contact 152 from switch 160, break the circuit from ground 198 through lead 192, and deenergize solenoid valve 184. upon the deenergization of solenoid valve 184, it recloses bypass conduit 178 thereby to reestablish the supplied fluid pressure to cylinder 22 to generally the same magnitude as the fluid pressure supplied to cylinders 18, 20 by pump 170, and the cylinders 18, 20, 22 are thereafter operable to continue the elevation of power pack 16 in the attitude thereof generally coincidental with the ground-engaging attitude of vehicle 12.

Of course, several different attitude variations in power pack 16 may occur during the elevation from the vehicle driving position to the displaced position thereof by cylinders 18, 20, 22, resulting in the energization of solenoid valves 180, 182, 184 in different sequences by sensing means 24 to correct such attitude variations. However, for the sake of brevity of disclosure, the energization of the solenoid valves in such different sequences is omitted because it occurs in the same manner as discussed above for cylinders 22. Furthermore, under certain attitude variations, the switch 160 may contact two of the contacts 150, 152, 154 to thereby bleed pressure fluid from the respective two cylinders.

When the power pack 16 reaches its fully displaced position, the operator places the enabling switch 194 in its open position and places the valve 169 in a second, closed position 2 as illustrated in dashed line in FIG. 10. The closed position 2 prevents the flow of pressure fluid between the manifold 171, pump 170 and valve 169 and thereby maintains the pressure of the fluid to the cylinders 18, 20, 22 to maintain the power pack 16 in its elevated position.

It may be noted that system 10 has a plurality of extendable means, such as, for instance, a looped battery cable 204, looped electrical cables 206, and a looped fuel line 208 or the like, for instance, as best seen in FIG. 1; and although not fully shown for the sake of drawing simplification, the cables 204, 206 and fuel line 208 are such length to interconnect respective component parts on power pack 16, for example starter, electric control and fuel nozzles, with an associated component part mounted to hull 30 of vehicle 12, for example battery 196, vehicle control and fuel tank, for maintaining communication therebetween upon the elevation of the power pack 16 from its vehicle driving position toward its displaced position. Therefore, the power pack 16 may be test run in its displaced position thereby to enhance servicing of the power pack 16.

In order to effect the return of power pack 16 from the displaced position to the vehicle driving position thereof, the operator manually moves or rotates valve 169 into a third, venting position 3 as shown in the dashed line in FIG. 10. In its venting position 3, valve 169 interrupts pressure fluid communication between it and pump 170 and interconnects the manifold 171 with the venting conduit 177 thereby to establish pressure fluid communication between the cylinders 18, 20, 22 and reservoir 172 for venting the cylinders 18, 20, 22. Valve 169 also provides a pressure fluid flow restriction which creates a fluid pressure drop between conduits 66, 68, 70 and venting conduit 177 when the valve 169 is in its venting position 3 in order to establish a predetermined rate of return movement of power pack 16 from the displaced position to the vehicle driving position thereof.

The system 10 is operable generally in the same manner as discussed above to compensate for attitude variation of power pack 16 with respect to the ground-engaging attitude of vehicle 12 during the return of the power pack 16 from the displaced position to the vehicle driving position thereof when the pressure fluid supplied to cylinders 18, 20, 22 is vented to reservoir 172 upon the movement of valve 169 to its venting position 3. More specifically, the operator again places the enabling switch 194 in its closed position so that if the extended length of any of the cylinders 18, 20, 22 exceeds that of the other cylinders during descent of power pack 16, the sensing device 24 is operable to effect additional venting of the relatively longer cylinder through the respective solenoid valves 180, 182, 184 as discussed above in the elevation mode of operation. In the descent mode, the operation of pump 170 is not required, and an additional suitable switch may be provided in lead 202 so that electrical power is not provided to it in the descent mode.

With reference to FIGS. 2, 11, 12 and 13, a means, such as a derrick device 216, for instance, may be utilized in one form of the invention for lifting or otherwise elevating or displacing a displaceable component part 218 of vehicle 12, for example an oil cooler, between a mounted or first position thereof in compartment 14 of the vehicle 12 and a displaced or second position with respect to the mounted position of the displacement component part 218, as best seen in FIG. 11.

Figure 12:
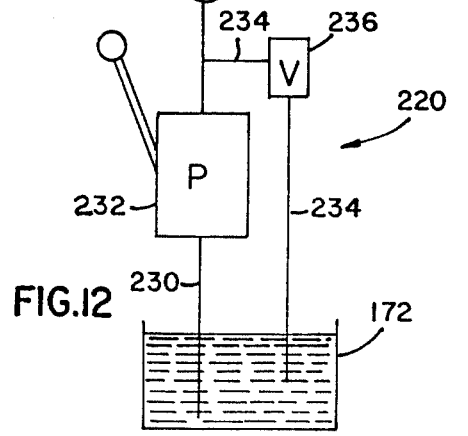
FIG. 12 is a schematic view illustrating an additional fluid pressure circuit adapted for use with that shown in FIG. 10 to effect the manual operation of the system as illustrated in FIG. 11.

In order to effect the aforementioned utilization of derrick device 216, system 10 may be alternatively provided with means, such as, for instance, an additional fluid pressure circuit indicated generally at 220 in FIG. 12, operable generally for selectively utilizing or actuating any one of cylinders 18, 20, 22 independently of the other cylinders. In fluid pressure circuit 220, three additional conduits 222, 224, 226 are connected in pressure fluid communication between respective ports provided therefor in a conventional three-way valve 228 and cylinders 18, 20, 22. Another conduit 230 is connected in pressure fluid communication between three-way valve 228 and reservoir 172, and a conventional hand pump 232 is interposed in conduit 230. A shunt conduit 234 is connected in shunt or bypass relation with conduit 230 about hand pump 232 therein, and a conventional on-off type two-way valve 236 is interposed in the shunt conduit 234.

In the event cylinder 22 is selected for actuation independently of cylinder 20, an operator will remove bolts 58a from the securing relation thereof between power pack 16 and plate 58 (see FIG. 2) and disassociate the plate 58 from the power pack 16 and upper end 56 of cylinder 22. With two-valve 236 in its off position interrupting pressure fluid communications through shunt conduit 234, three-way valve 228 may be selectively positioned by the operator to block flow to conduits 222, 224 and establish pressure fluid communication between conduits 226, 230 thereby to connect cylinder 22 in fluid circuit relation with hand pump 232. Hand pump 232 may then be manually operated to supply pressure fluid from reservoir 172 through conduits 226, 230 and three-way valve 228 to cylinder 22 establishing a fluid pressure to effect the extension of cylinder 22 in the manner previously discussed.

Similarly, the valve 228 may also be selectively positioned to establish flow to either conduit 222 or 224 while blocking flow to the respective other two conduits for extending cylinders 18 or 20.

Derrick device 216 includes a pair of interconnected arms i.e. boom 238 and brace 240, having openings 242, 244 therein, respectively. Upon the extension of an upper sleeve 22a of cylinder 22 by the operation of hand pump 232, opening 244 of brace 240 may be received about the upper sleeve 22a with the brace 240 being arranged in abutment with an intermediate sleeve 22b of the cylinder 22. When brace 240 of derrick device 216 is so abutted with the intermediate sleeve 22b, upper end 56 of cylinder 22 is received in opening 242 of derrick boom 238 with boom 238 being sealed in abutment on flange 57 of the cylinder upper end 56. Thus, it may be noted that derrick device 216 is associated with cylinder 22 for conjoint elevational movement therewith and for rotational movement about the cylinder 22 relative thereto. Pulleys 246, 248 are arranged on derrick boom 238 and brace 240 and receive a cable 250. Cable 250 has one end thereof secured at anchor 252 in compartment 14, and an opposite end of the cable 250 is releasably secured by a conventional connection 254, hooks for example, with the aforementioned displaceable component part 218 of vehicle 12.

When derrick device 216 is mounted to cylinder 22 and cable 250 is secured to component 218 of vehicle 12, as discussed above, hand pump 232 may be further actuated by the operator to effect further extension of cylinder 22 in the manner previously discussed. Upon the aforementioned further extension of cylinder 22, derrick device 216 and pulleys 246, 248 thereon are conjointly extended or raised therewith relative to cable 250 thereby to effect the lifting of the component part 218 from a mounted position toward a displaced position thereof for servicing or replacement.

Subsequent to the aforementioned servicing of component part 218 supported on derrick device 216, the component part 218 may be returned from the displaced position toward the mounted position thereof. To effect the return of component part 218 toward its mounted position, two-way valve 236 may be moved by the operator from its off position to its on position. When two-way valve 236 is in its on position, pressure fluid communication is established through shunt conduit 234, and pressure fluid is returned from cylinder 22 through conduit 226, three-way valve 228, conduits 230, 234 and the two-way valve 236 to reservoir 172. This return flow of pressure fluid alleviates the established fluid pressure at cylinder 22 effecting the deactuation thereof, and upon such deactuation of cylinder 22, the component part 218 supported by derrick device 216 is returned or lowered into its mounted position within compartment 14 of vehicle 12. The two-way valve 236 may include an orifice restriction to establish a fluid pressure drop thereacross to impede the return pressure fluid flow therethrough so as to slow down the lowering of cylinder 18.

While there has been described herein what are considered to be preferred embodiments of the invention, other modifications will occur to those skilled in the art from the teachings herein.

For example, although the cylinders 18, 20, 22 are fluid responsive they could be any type of extendable or retractable devices, such as racks and pinions for example. Although the power pack 16 is elevated by the cylinders 18, 20, 22, the power pack 16 could be lowered in alternate embodiments. Although an electrical circuitry 28 is operable with DC current, an analogous circuitry utilizing AC current could be used.

It is, therefore, desired to secure in the appended claims all such modifications as fall within the true spirit and scope of the invention.

Having thus described preferred embodiments of the invention, what is claimed as novel and desired to be secured by Letters of Patent of the United States is:

1. A system, for use in a vehicle having a ground-engaging attitude, to effect the displacement from a compartment in the vehicle of a power pack adapted for driving the vehicle, the system comprising:
   actuating means operable generally for elevating the power pack from a vehicle driving first position thereof within the compartment toward a second position disposed at least in part exteriorly of the compartment and for maintaining the power pack at least generally at the same attitude as the ground-engaging attitude of the vehicle at least during the elevation of the power pack;
   means associated with the power pack for sensing attitude variations of the power pack at least upon its elevation between said first position and said second position; and
   means associated with said sensing means and said elevating and maintaining means and actuated in response to the sensed attitude variations for controlling the operation of said elevating and maintaining means.

2. The system as set forth in claim 1 further comprising a fluid pressure source, and said actuating means comprising a plurality of actuating means relatively movable in response to fluid pressure supplied thereto from said fluid pressure source for actuating the power pack from said first position to said second position thereof, respectively.

3. The system as set forth in claim 2 wherein said controlling means includes a plurality of means connected in pressure fluid communication with said fluid pressure source and respective ones of said actuating means and in electrical circuit relation with said sensing means for regulating the magnitude of the fluid pressure and flow supplied from said fluid pressure source to said actuating means in response to the attitude variations of the power pack sensed by said sensing means.

4. The system as set forth in claim 3 wherein said regulating means comprise a plurality of solenoid valves connected in pressure fluid bypass relation between respective ones of said actuating means and said fluid pressure source and in said electrical circuit relation with said sensing means.

5. The system as set forth in claim 4 wherein said controlling means further include a plurality of first conduit means connected in pressure fluid communication between said actuating means and said fluid pressure source, and a plurality of second conduit means connected in said fluid pressure bypass relation between said first conduit means and said fluid pressure source, said solenoid valves being interposed in said second conduit means, respectively.

6. The system as set forth in claim 2 wherein said sensing means include means operable generally in response to the attitude variations of the power pack for switching between a plurality of switching modes, said switching means in one of said switching modes thereof being connected in said electrical circuit relation with said controlling means to effect the actuation thereof.

7. The system as set forth in claim 6 wherein said sensing means further include housing means arranged in a vertical suspended position from a part of the power pack for pendulum movement with respect thereto indicative of the ground-engaging attitude of the vehicle, and a chamber for said housing means, said switching means being arranged in a vertical suspended position within said chamber for pendulum movement within said housing means.

8. The system as set forth in claim 7 wherein said sensing means further include a plurality of electrical contact means disposed in preselected positions within said chamber and connected in said electrical circuit relation with said controlling means for circuit making engagement with said switching means in said one switching mode thereof to effect the operation of said controlling means.

9. The system as set forth in claim 8 wherein said sensing means further include means mounted to another part of the power pack and operable generally for gripping in engagement with a part of said housing means thereby to capture said housing means in its vertical suspended position, said housing means being conjointly movable with the power pack in the event of occurrence of attitude variations upon elevation of said power pack from said first position toward said second position thereof so as to connect one of said electrical contact means in said circuit making engagement with said switching means to effect the actuation of said controlling means.

10. The system as set forth in claim 7 wherein said sensing means further include means in said chamber for damping the movement of said switching means.

11. The system as set forth in claim 1 further comprising at least one mounting means for resiliently mounting and releasably securing the power pack to the vehicle in said first position.

12. The system as set forth in claim 11 wherein said mounting means include an upper plate and a lower plate disposed generally in opposed relation for mounting to the power pack and to a part of the vehicle within the compartment thereof, respectively, resilient means disposed for cushioning engagement between said upper and lower plates, and jaw means movable on said lower plate for releasable engagement with said upper plate.

13. The system as set forth in claim 12 wherein said mounting means further include means on said lower plate operable for effecting the movement of said jaw means.

14. The system as set forth in claim 13 wherein said movement effecting means comprises a threaded shaft arranged in driving engagement with said jaw means, and gearbox means arranged in driving engagement with said shaft and operable for driving said shaft to effect the driving engagement thereof with said jaw means.

15. The system as set forth in claim 1 wherein the power pack as a pair of generally opposite annular extension means for receiving a pair of generally opposed drive shafts adapted to be rotatably driven by the power pack and wherein the system further comprises a pair of means, each mounted to a part of the vehicle within the compartment thereof and releasably received about the extension means for supporting the power pack, respectively.

16. The system as set forth in claim 15 wherein each of said supporting means includes means mounted to the vehicle part for seating a part of one of said extension means, means arranged generally in opposed relation with said seating means for extending about another part of said one extension means, and a pair of jaw means on said seating means and relatively movable with respect thereto for releasable engagement with said extending means.

17. The system as set forth in claim 16 wherein each of said supporting means further includes means arranged in driving engagement with respective ones of said jaw means and operable for effecting the relative movement of said jaw means.

18. The system as set forth in claim 17 wherein said relative movement effecting means includes a gear rotatably disposed on said seating means in driving engagement with said jaw means, and gearbox means mounted to said vehicle within the compartment thereof and operable for rotating said gear to effect the driving engagement thereof with said jaw means.

19. The system as set forth in claim 2 further comprising a pressure fluid source, and pump means associated with said pressure fluid source and said actuating means and manually operable for supplying fluid pressure from said pressure fluid source to said actuating means to effect the elevation of the power pack from said first position to said second position independently of said sensing means and said controlling means.

20. The system as set forth in claim 2 wherein the power pack has at least one component removably secured thereto and wherein the system further comprises means interconnected between said one component and one of said actuating means and operable generally for displacing said one component from the power pack upon the relative movement of the one actuating means in response to fluid pressure supplied thereto, a pressure fluid source, and pump means associated with said pressure fluid source and said one actuating means and manually operable for supplying fluid pressure from said pressure fluid source to said one actuating means to effect the relative movement thereof independently of said sensing means and said controlling means.

21. The system as set forth in claim 1 wherein the power pack has a first component part arranged in communication with an associated second component part mounted to the vehicle and wherein the system further comprises an extendable means interposed between said first component part and said second component part for maintaining communication therebetween at least upon the elevation of the power pack from said first position toward said second position thereof.

22. The system for displacing a power pack component of a vehicle from a compartment in said vehicle comprising:
   means for releasably mounting said component in said vehicle;
   means for displacing said component from an initial first position to a displaced second position;
   means for sensing attitude variations of said component; and
   means for controlling said displacing means in response to said sensing means for maintaining said component in a selected attitude from said first position to said second position.

23. The system as set forth in claim 22 wherein said displacing means comprise a plurality of actuating means for extending and retracting said component, said actuating means being spaced from one another and attached to both said component and said vehicle.

24. The system as set forth in claim 23 wherein said actuating means comprise fluid pressure responsive telescoping cylinders.

25. The system as set forth in claim 23 wherein each of said actuating means has an unextended length and further comprises guide means having a length generally commensurate with said unextended length, said guide means including a slide fixedly attached to said component and a guide rail having a slot for securing said slide in sliding cooperation therewith, and also having a groove for receiving a complementary tongue of said actuating means, said guide means being effective for ensuring parallel movement of said component and said actuating means as said actuating means extend and retract.

26. The system as set forth in claim 23 wherein said sensing means comprise:
   a housing having an upper end pivotally attached to said component, and an unrestrained lower end;
   an electrical switch comprising:
      a pendulum member having an upper end pivotally attached to said housing upper end;
      an unrestrained lower end including an annular first contact disposed perpendicularly to a longitudinal axis of said pendulum member and a plurality of second contacts circumferentially spaced and attached to said housing and spaced from said first contact; and
      means attached to said component for selectively restraining movement of said housing lower end operable in a first mode allowing unrestrained movement of said housing lower end and in a second mode for preventing movement of said housing lower end;
   said sensing means being operable in said first mode so that the relative position of said housing with respect to said component provides a reference indication of the attitude of said component, and operable in said second mode to maintain said reference attitude indication as said displacing means are actuated;
   said pendulum member being pivotable in response to variations in said component attitude from said reference indication and allowing said first contact to engage at least one of said second contacts for closing said electrical switch to indicate an attitude variation; and said controlling means being responsive to said closed switch.

27. The system as set forth in claim 26 including three of said actuating means and three of said sensing means second contacts, said second contacts being circumferentially spaced around said housing and aligned along respective radial lines extending from said pendulum member longitudinal axis to said three actuating means so that the engagement of said first contact with one of said second contacts is indicative of an attitude variation of said component due to a relatively different actuated length of the actuating means aligned with said one of said second contacts.

28. The system as set forth in claim 26 wherein said housing lower end restraining means comprise an electrically actuated solenoid attached to said component having an extendable and retractable stem and a head attached to said stem, said housing lower end having a concave inner surface with a central opening therein, said stem extending from said solenoid through said opening and said head having a convex lower surface spaced from and complementary to said concave surface, said opening being predeterminedly sized larger than a diameter of said stem to allow unrestrained movement of said housing lower end during said first mode, and during said second mode said solenoid being energized to retract said stem for engaging said head against said concave surface to prevent movement of said housing lower end.

29. The system as set forth in claim 26 wherein:

each of said actuating means comprises a telescopic fluid pressure responsive cylinder;

said displacing means further comprise:
a pressure fluid reservoir;
a fluid pumping means in flow communication with said reservoir; and
a plurality of fluid first conduits respective connecting said cylinders to said pumping means;

said controlling means comprising:
a plurality of fluid second conduits respectively connecting said first conduits to said reservoir;
a plurality of solenoid valves respectively interposed in said second conduits;
electrical connecting means respectively joining said sensing means second contacts to said displacing means solenoid valves; and
means to selectively provide electrical power to said displacing means solenoid valves;

said displacing means solenoid valves being initially closed and being respectively openable when said sensing means second contacts engage said sensing means first contact in response to a component attitude variation in said second mode for channeling pressurized fluid flowable through a respective one of said first conduits from said pumping means and through a respective one of said second conduits to said reservoir to bypass at least a portion of pressure fluid from a respective one of said cylinders.

30. The system as set forth in claim 29 including three each of said cylinders, first conduits, second conduits, second contacts, and solenoid valves, said three cylinders being spaced from each other in a triangular manner.

31. The system as set forth in claim 30 wherein said component comprises a power pack including an engine operatively connected to a transmission.

32. The system as set forth in claim 23 wherein said component mounting means comprise:
a plurality of trunnions fixedly extending from said component; and
a plurality of first supports each comprising:
a saddle fixedly connected to said vehicle for receiving one of said trunnions for supporting said component;
a cap disposed over said one trunnion; first and second spaced jaw means rotatably connected to said saddle and operable to clamp said cap over said trunnion and to said saddle; and
means for selectively positioning said first and second jaw means in a first position clamping said trunnion between said cap and said saddle, and in a second position allowing said cap to be removed for releasing said trunnion from said saddle.

33. The system as set forth in claim 32 wherein said positioning means comprise:
a shaft having a left hand thread operatively connected to said first jaw means and a right hand thread operatively connected to said second jaw means; and
means for rotating said shaft for clamping and releasing said trunnion.

34. The system as set forth in claim 33 wherein said component includes a rotatable drive shaft extending through said trunnion.

35. The system as set forth in claim 32 wherein said component mounting means further include at least one second support spaced from said first supports comprising:
a first mounting plate fixedly connected to said component;
a second mounting plate fixedly connected to said vehicle;
resilient means disposable between said first and second plates for resiliently restraining movement of said component about said first supports;
third and fourth spaced jaw means rotatably connected to said second plate and operable to clamp said first plate over said resilient means to said second plate; and
means for selectively positioning said third and fourth jaw means in a first position clamping said first plate to said resilient means and said second plate, and in a second position allowing said first plate to be displaced from said second plate for displacing said component.

36. The system as set forth in claim 35 wherein said positioning means comprise:
a shaft having a left hand thread operatively connected to said third jaw means and a right hand thread operatively connected to said fourth jaw means; and
means for rotating said shaft for clamping and releasing said first plate.

37. The system as set forth in claim 23 further including a derrick device removably attached to one of said actuating means, and means for independently actuating said one actuating means for displacing said derrick device for displacing a second component in said vehicle from an initial position to a displaced position.

38. The system as set forth in claim 37 wherein said derrick device includes a boom attachable to an upper end of said one actuating means, a brace joined to both said boom and an intermediate portion of said one actuating means and a cable fixedly connected at one end to said vehicle, slidably connected at an intermediate portion to said boom and releasably attachable at an opposite end to said second component; and said independent actuating means include a pump communicating with said one actuating means.

* * * * *